United States Patent
Fimml

(10) Patent No.: US 12,378,921 B2
(45) Date of Patent: Aug. 5, 2025

(54) INTERNAL COMBUSTION ENGINE AND A METHOD FOR OPERATING AN INTERNAL COMBUSTION ENGINE

(71) Applicant: INNIO Jenbacher GmbH & Co OG, Jenbach (AT)

(72) Inventor: Wolfgang Fimml, Maurach in Tirol (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/688,356

(22) PCT Filed: Sep. 3, 2021

(86) PCT No.: PCT/AT2021/060309
§ 371 (c)(1),
(2) Date: Feb. 29, 2024

(87) PCT Pub. No.: WO2023/028626
PCT Pub. Date: Mar. 9, 2023

(65) Prior Publication Data
US 2024/0360796 A1    Oct. 31, 2024

(51) Int. Cl.
*F02D 19/02* (2006.01)
*F02D 19/06* (2006.01)
*F02D 19/08* (2006.01)

(52) U.S. Cl.
CPC ....... *F02D 19/024* (2013.01); *F02D 19/0644* (2013.01); *F02D 19/0647* (2013.01); *F02D 19/0689* (2013.01); *F02D 19/08* (2013.01)

(58) Field of Classification Search
CPC ............... F02D 19/024; F02D 19/0644; F02D 19/0647; F02D 19/0689; F02D 19/08
See application file for complete search history.

(56) References Cited

U.S. PATENT DOCUMENTS

| | | |
|---|---|---|
| 8,406,979 B2 | 3/2013 | Loeffler et al. |
| 8,972,151 B2 | 3/2015 | Hirose et al. |
| (Continued) | | |

FOREIGN PATENT DOCUMENTS

| | | |
|---|---|---|
| CN | 103026034 A | 4/2013 |
| DE | 102013221777 A1 | 4/2015 |
| (Continued) | | |

OTHER PUBLICATIONS

Machine Translation of DE102018222525A1 PDF File Name: "DE102018222525A1_Machine_Translation.pdf".*

(Continued)

*Primary Examiner* — Lindsay M Low
*Assistant Examiner* — Ruben Picon-Feliciano
(74) *Attorney, Agent, or Firm* — Fletcher Yoder, P.C.

(57) ABSTRACT

A controller configured to control a gas mixing device and/or a port injection valve and a direct fuel injector of an internal combustion engine in order to:
  in a first operation mode, supply a first gaseous fuel to at least one main combustion chamber of the internal combustion engine via at least one intake valve,
  in a second operation mode, supply a second gaseous fuel to the at least one main combustion chamber of the internal combustion engine by use of the direct fuel injector,
wherein a supply system for providing flushing gas to the direct fuel injector is provided and the controller is configured to activate the direct fuel injector during operation according to the first operation mode, such that the flushing gas is injected into the at least one main combustion chamber.

23 Claims, 4 Drawing Sheets

(56) References Cited

U.S. PATENT DOCUMENTS

| | | |
|---|---|---|
| 9,188,084 B2 | 11/2015 | Fiveland et al. |
| 9,611,796 B2 | 4/2017 | Namekawa |
| 10,323,566 B2 * | 6/2019 | Fuchs .................... F02B 19/12 |
| 2011/0079198 A1 | 4/2011 | Moessner et al. |
| 2013/0133624 A1 | 5/2013 | Hirose et al. |
| 2013/0213347 A1 * | 8/2013 | Schaumberger ...... F02B 17/005 |
| | | 123/253 |
| 2016/0273476 A1 | 9/2016 | Namekawa |
| 2021/0115840 A1 * | 4/2021 | Michels .............. F02B 29/0481 |

FOREIGN PATENT DOCUMENTS

| | | |
|---|---|---|
| DE | 102016104397 A1 | 9/2016 |
| DE | 102015214700 A1 * | 2/2017 |
| DE | 102018222525 A1 * | 6/2020 |
| EP | 2915986 A1 | 9/2015 |
| EP | 3425185 A1 | 1/2019 |
| WO | 2016005487 A1 | 1/2016 |

OTHER PUBLICATIONS

Machine Translation of DE102015214700A1 PDF File Name: "DE102015214700A1_Machine_Translation.pdf".*
PCT International Search Report and Written Opinion; Application No. PCT/AT2021/060309; dated May 25, 2022; 16 pages.

* cited by examiner

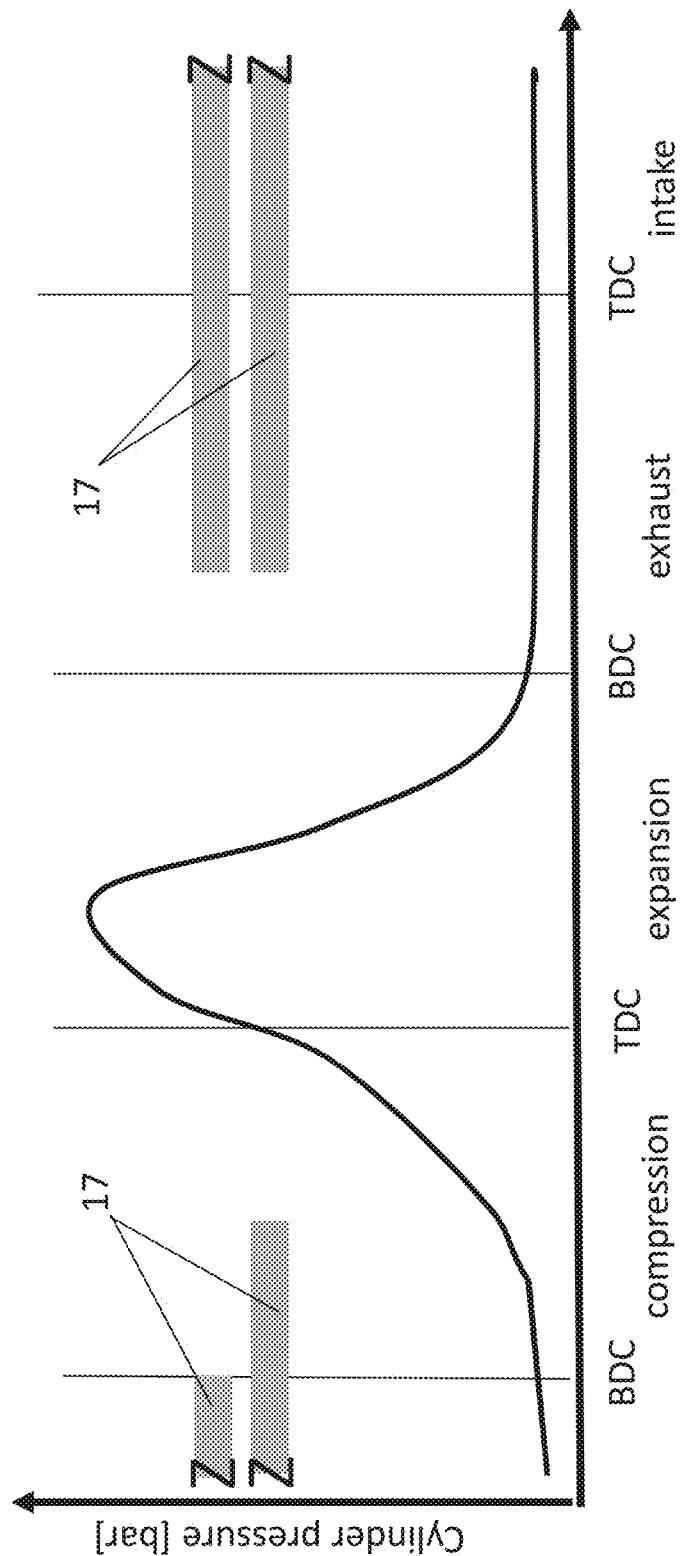

INTERNAL COMBUSTION ENGINE AND A METHOD FOR OPERATING AN INTERNAL COMBUSTION ENGINE

CROSS-REFERENCE TO RELATED APPLICATION

This application is a National Stage entry from, and claims benefit of, PCT Application No. PCT/AT2021/060309, filed on Sep. 3, 2021, entitled "INTERNAL COMBUSTION ENGINE AND A METHOD FOR OPERATING AN INTERNAL COMBUSTION ENGINE", which is herein incorporated by reference in its entirety.

BACKGROUND

The present invention concerns an internal combustion engine, preferably a flexible fuel combustion engine, with the features of the claims and a method for operating such an internal combustion engine with the features of the claims.

Internal combustion engines known by the state of the art comprise at least one main combustion chamber, wherein, in the main combustion chamber of the piston-cylinder units, an air-fuel mixture is combustible.

Internal combustion engines, preferably flexible fuel combustion engines, are capable to combust at least two different gaseous fuels in different operation modes. The operation modes can be switched depending on an availability or the price of the fuels. Therefore, a possibility is given to increase the flexibility of an internal combustion engine regarding changes in the fuel market, wherein the internal combustion engine can be quickly adjusted to change an operation mode to combust a different fuel.

On the one hand, it is known to provide the combustible air-fuel mixture via the intake port (and therefore via the intake valve) to the main combustion chambers, wherein a central mixing device or a port injection valve is used to admix (e.g., gaseous) fuel to the intake air. This is also known as "external mixture formation" by the person skilled in the art.

Another method of supplying fuel to the main combustion chambers is direct injection, wherein the fuel is directly injected into the main combustion chamber via a direct fuel injector, wherein the directly injected fuel is mixed with air in the main combustion chamber (also known as "internal mixture formation").

Direct fuel injectors are generally affected by the high thermal loads generated during engine operation. It is commonly known to reduce the thermal load of fuel injectors by cooling the fuel injectors passively by the injected fuel.

There are also active cooling systems known which cool down portions of the injectors as close as possible to the main combustion chamber (e.g., from U.S. Pat. No. 9,188,084 B1 or CN 103026034 A). Such configurations have the disadvantage that they are very complicated and expensive to manufacture.

BRIEF DESCRIPTION

An aspect of the invention is to provide an internal combustion engine and a method for operating an internal combustion engine, wherein the risks of malfunctions of the direct fuel injector caused by thermal loads and deposits are minimized, in particular without the before-mentioned drawbacks, especially when external- and internal mixture formation operation modes are sequentially combined.

This aspect is achieved by an internal combustion engine with the features of the claims and a method for operating an internal combustion engine with the features of the claims.

According to certain embodiments of the invention, it is provided, that an internal combustion engine comprises:
  at least one main combustion chamber,
  a gas mixing device and/or a port injection valve, which is configured to supply a first gaseous fuel, preferably natural gas, to the main combustion chamber via at least one intake valve,
  a direct fuel injector, which is configured to directly inject a second gaseous fuel, preferably hydrogen, into the main combustion chamber, and
  a control unit, which is configured to control the gas mixing device and the direct fuel injector in order to:
    in a first operation mode, supply the first gaseous fuel to the at least one main combustion chamber of the internal combustion engine via the at least one intake valve,
    in a second operation mode, supply a second gaseous fuel to the at least one main combustion chamber of the internal combustion engine by use of the direct fuel injector,
characterized in that, a supply system for providing flushing gas to the direct fuel injector is provided and the control unit is configured to—preferably intermittently—activate the direct fuel injector during operation according to the first operation mode, such that the flushing gas is injected into the at least one main combustion chamber.

By providing flushing gas via the direct fuel injector to the main combustion chamber during operation according to the first operation mode according to an embodiment of the invention, in a simple way the direct fuel injector can be cooled by the flushing gas to reduce the thermal load on the direct fuel injector.

In other words, when the internal combustion engine is operated according to a first operation mode, in which the first fuel or the combustible mixture of air and the first fuel is provided by the gas mixing device or the port injection valve and supplied via at least one intake valve, for a prolonged amount of time, the direct fuel injector (which is configured to inject a second fuel during operation according to second operation mode directly into the at least one main combustion chamber) is not kept in a deactivated state, but is activated temporarily with a flushing gas to maintain its functionality.

By—preferably intermittent—activation of the direct fuel injector furthermore deposits can be reduced in the area of the direct fuel injector by through flow of the flushing gas, such that the deposits can be relieved in a timely manner by the flushing gas during operation according to the first operation mode.

Preferably, it can be provided that only second fuel is supplied during operation according to the second operation mode to the main combustion engine.

It can be provided that except the—preferably intermittently—provided flushing gas to the direct fuel injector during operation according to the first operation mode, only the first fuel and air is injected or provided for combustion in the at least one main combustion chamber.

It can be provided that during operation according to the second operation mode, only the second fuel and air is injected or provided for combustion in the at least one main combustion chamber.

The gas mixing device can, for example, be embodied as a mixing valve in an intake manifold of the internal combustion engine. Such a mixing valve can be arranged upstream of a compressor of a turbocharger (mixture charged engine) and/or downstream of a compressor of a turbocharger (air charged engine). Alternatively or additionally to the gas mixing device, it is possible to use a port injection valve in a port section of the intake manifold, the port section being a portion of the intake manifold leading to an individual intake valve of the main combustion chamber.

The internal combustion engine, according to certain embodiments of the invention, can be arranged together with a generator for producing electrical energy and can be configured to drive the generator.

The internal combustion engine can preferably have a plurality of main combustion chambers (e.g., ten or more main combustion chambers).

The main combustion chambers can be embodied between the cylinders and reciprocating pistons of piston-cylinder units.

There can be provided one direct fuel injector or more direct fuel injectors for each main combustion chamber.

Preferred embodiments are defined in the dependent claims.

It can be provided that the control unit is configured to activate the direct fuel injector during an exhaust and/or an intake and/or a compression stroke of the at least one main combustion chamber in the first operation mode.

Preferably, it is provided that the control unit is configured control the direct fuel injector in order to supply air and/or an inert gas as flushing gas to the main combustion chamber during operation according to the first operation mode.

Therefore, it can be provided that the air as flushing gas is supplied during exhaust and/or intake and/or compression stroke as it does not affect the combustion process notably, as no additional fuel source is given during operation according to the first operation mode (additionally to the first gaseous fuel supplied via the at least one intake valve during operation according to the first operation mode).

It can be provided that the control unit is configured to control the direct fuel injector in order to supply a second fuel and/or a different gaseous fuel as flushing gas via the direct fuel injector to the at least one main combustion chamber during operation according to the first operation mode, preferably during an exhaust stroke of the internal combustion engine.

If second fuel or a different fuel as flushing gas is supplied via the direct fuel injector into the at least one main combustion chamber during the exhaust stroke, a combustion in the exhaust manifold can be reached. Such a combustion of the flushing gas in an exhaust manifold can preferably be used to increase the exhaust temperatures in the presence of, e.g., a selective catalytic reduction (SCR) converter and/or three way converter, such that the converter temperature can be controlled.

Preferably, it can be provided that the control unit is configured to activate the direct fuel injector to supply flushing gas during a period of time in the combustion cycle during operation according to the first operation mode, when a pressure level in the at least one main combustion chamber is below a pressure level upstream of the direct fuel injector in the supply system for flushing gas. Therefore, it can be provided that the risk of flash backs through the direct fuel injector (based on a pressure drop from the at least one main combustion chamber trough the direct fuel injector) is executed without any further component parts (e.g., without a check valve and/or a flame barrier).

It can be provided that the control unit is configured control the direct fuel injector in order to supply maximally 10%, preferably maximally 5%, particularly preferably maximally 2%, of the overall energy amount released during a combustion cycle during operation according to the first operation mode by flushing gas in the form of a fuel via the direct fuel injector.

It can be provided that the control unit is configured to control the direct fuel injector in order to supply a mass of air and/or inert gas, which mass of air and/or inert gas is maximally 50%, preferably maximally 25%, particularly preferably maximally 5%, of an overall fuel mass supplied to the at least one main combustion chamber during a combustion cycle during operation according to the first operation mode via the direct fuel injector.

During operation according to the first operation mode, it can be provided that the control unit is configured to supply the almost entire energy amount—preferably the entire energy amount—combusted during a combustion cycle by use of the gas mixer via the at least one intake vale into the main combustion chamber, wherein the supplied flushing gas does not notably effect the combustion (wherein preferably the flushing gas is provided by no fuel, but, e.g., air or inert gas, in such embodiments).

Preferably, it can be provided that the control unit is configured to activate the direct fuel injector during operation according to the first operation mode after a predefined number of combustion cycles without activating the direct fuel injector have passed. Such an activation of the direct fuel injector during operation according to the first operation mode after a predefined number of combustion cycles can be done intermittently, in particular periodically or with changing intervals. Here, it can preferably be provided that the combustion cycles are counted for each main combustion chamber separately.

It can be provided that the control unit is configured to control the gas mixing device in order to:
supply, during operation according to in the first operation mode, an air-fuel-mixture comprising air and the first fuel into the at least main combustion chamber via the at least one intake valve, and/or
supply, during operation according to in the second operation mode, air to the at least one main combustion chamber of the internal combustion engine via the at least one intake valve, such that an air-fuel-mixture is provided by mixing of the supplied air and the supplied second fuel in the at least one main combustion chamber.

Preferably, it can be provided that at least one spark plug is provided in the at least one main combustion chamber to ignite the combustion during operation according to the first operation mode and/or the second operation mode.

There can be provided:
a first source for the first gaseous fuel connected to the gas mixing device, and/or
a second gaseous fuel source for the second gaseous fuel connected to the direct fuel injector, wherein there is furthermore provided a switching valve such that the direct fuel injector can be supplied with the second gaseous fuel by the second gaseous fuel source in the second operation mode and can be supplied by the supply system of flushing gas for providing flushing gas during the first operation mode.

The control unit can be configured to actuate the switching valve to provide the second fuel during operation according to the second operation mode and/or to provide flushing gas to the direct fuel injector during operation according to the first operation mode.

Alternatively, it can be provided that the supply system of flushing gas is configured to supply the second gaseous fuel to the direct fuel injector during operation according to the second operation mode, wherein the flushing gas and the second gaseous fuel are identical.

Preferably, it can be provided that the control unit is configured to control the direct fuel injector such that a time of injection, a time of activation of the direct fuel injector and/or an amount of injected flushing gas during operation according to the first operation mode differs from the time of injection, the time of activation of the direct fuel injector and/or the amount of injected second fuel during operation according to the second operation mode.

Protection is also sought for a method for operating an internal combustion engine, wherein the method comprises:
supplying, in a first operation mode, a first gaseous fuel, preferably natural gas, via at least one intake valve to at least one main combustion chamber of the internal combustion engine,
supplying, in a second operation mode, a second gaseous fuel, preferably hydrogen, directly by use of a direct fuel injector into the at least one main combustion chamber using a direct fuel injector,
wherein the method further comprises, during operation according to the first operation mode, activating the direct fuel injector—preferably intermittently, such that the flushing gas is injected into the at least one main combustion chamber.

BRIEF DESCRIPTION OF THE DRAWINGS

Further details and advantages of the invention are apparent from the accompanying figures and the following description of the figures. The figures show:

FIG. 4 illustrates a schematically diagram of a cylinder pressure during the combustion phases of an internal combustion engine.

DETAILED DESCRIPTION

Figure 1:
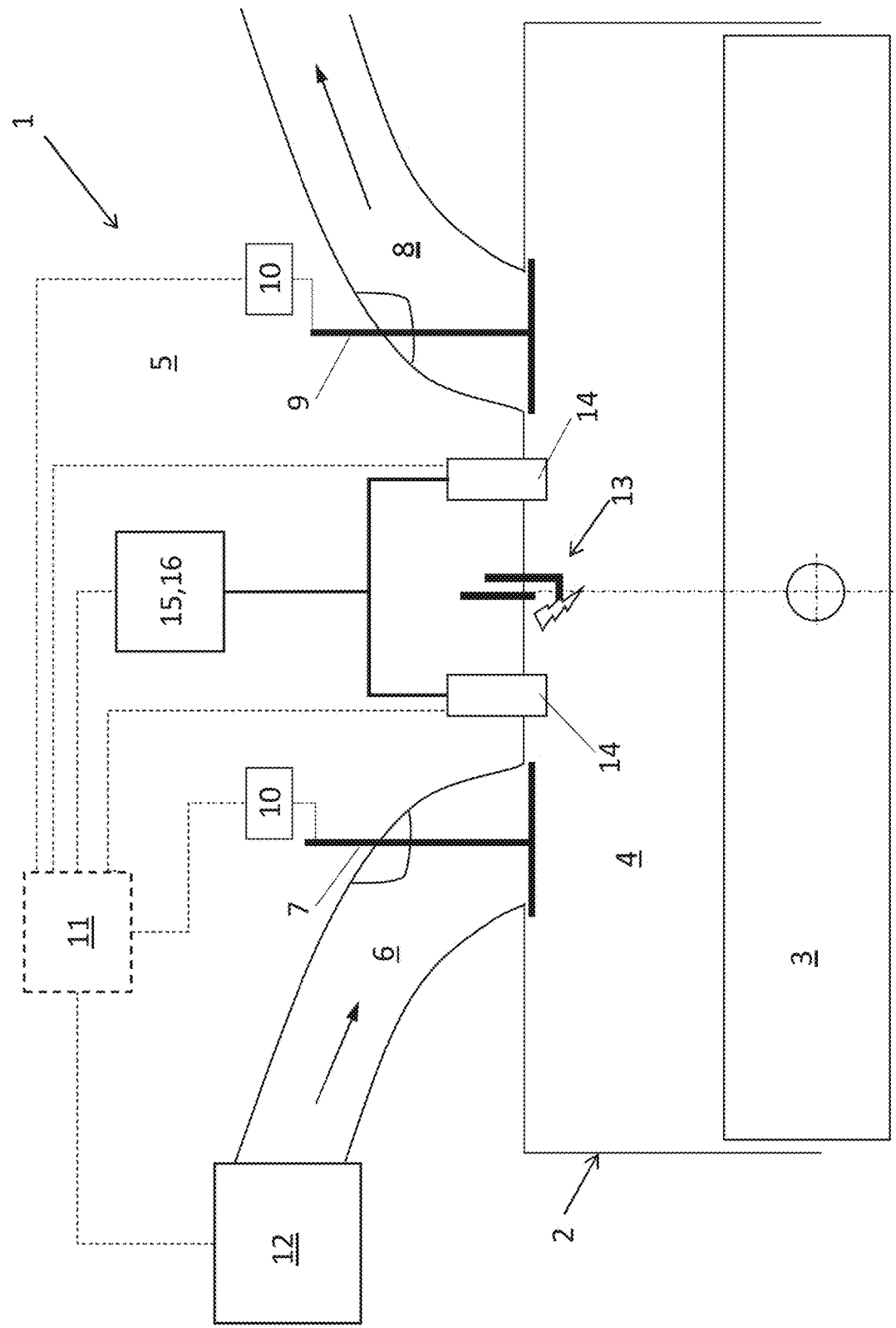
FIG. 1 schematically illustrates a piston-cylinder unit of an internal combustion engine according to a first embodiment of the invention, FIG. 2 schematically illustrates a piston-cylinder unit of an internal combustion engine according to a second embodiment of the invention.

FIG. 1 schematically shows a piston-cylinder unit of an internal combustion engine 1, wherein a reciprocating piston 3 is arranged in a cylinder 2 so as to be movable along an axis of the cylinder 2, whereby a main combustion chamber 4 is formed between the piston 3, the cylinder head 5 and the cylinder 2. At its top dead center, the piston 3 with the cylinder 2 forms the so-called compression volume.

The cylinder 2 may comprise a cylinder liner and/or a crank case. For the purpose of the present invention, such components are collectively referred to as cylinder 2.

The intake port 6 is arranged at an interface between the main combustion chamber 4 and at least one intake valve 7.

The exhaust manifold 8 is arranged at an interface between the main combustion chamber 4 and at least one exhaust valve 9.

The at least one intake valve 7 and the at least one exhaust valve 9 can be actuated by the actuators 10. Example actuators 10 for the at least one intake valve 7 and the at least one exhaust valve 9 are a camshaft or hydraulic devices.

The actuators 10 may optionally be connected by a signal line to the control unit 11, wherein opening and closing of the at least one intake valve 7 and the at least one exhaust valve 9 can be controlled by the control unit 11, e.g., in connection with a variable valve train.

A main combustion intake system 20 including a gas mixing device 12 (see FIG. 3) is arranged upstream of the intake port 6, wherein by use of the gas mixing device 12 a fuel-air-mixture (e.g., a mixture of air and natural gas) can be provided for the intake port 6. Also the gas mixing device 12 is connected by a signal line to the control unit 11, wherein the function of the gas mixing device 12 can be controlled by control unit 11.

Furthermore, at least one compressor can be arranged upstream of the intake port 6, wherein the provided air or air-fuel mixture for the intake port 6 can be charged.

The ignition source is in this embodiment a spark plug 13.

Directly at the main combustion chamber 4, two direct fuel injectors 14 are arranged—here provided as a hydrogen injectors—wherein the direct fuel injectors 14 are configured to directly inject a second gaseous fuel, preferably hydrogen, into the main combustion chamber 4. Alternatively or additionally, second fuels in the form of, e.g., e-fuels, methanol and so on are in principle conceivable.

The direct fuel injectors 14 are supplied by a second fuel by the second gaseous fuel (hydrogen) source 15, wherein the second gaseous fuel source 15 is also connected to the control unit 11 by a signal line.

The direct fuel injectors 14 are also connected by signal lines with the control unit 11, wherein the control unit 11 is configured to control an injection of the direct fuel injectors 14.

The control unit 11 of this embodiment is configured to control the gas mixing device 12 and the direct fuel injector 14 in order to:
in a first operation mode, supply the first gaseous fuel to the at least one main combustion chamber 4 of the internal combustion engine 1 via the at least one intake valve 7, and to
in a second operation mode, supply a second gaseous fuel to the at least one main combustion chamber by use of the direct fuel injectors 14.

During operation according to the first operation mode, the control unit 11 is configured to control the gas mixing device 12 (or a port injection valve) in order to supply an air-fuel-mixture comprising air and the first fuel (e.g., natural gas) into the at least main combustion chamber 4 via the at least one intake valve 7.

Alternatively or additionally, it can be provided that the first fuel is supplied by an port injection valve upstream of the intake valve 7 into the intake port 6 and/or the intake manifold 21, wherein the first fuel is mixed at the intake port 6 and/or the intake manifold 21 with an—preferably charged—air mass to provide the air-fuel-mixture which is supplied via the intake valve 7 into the main combustion chamber 4 during an operation according to the first operation mode.

Furthermore, the control unit 11 is configured to—preferably intermittently—activate the direct fuel injectors 14 during operation according to the first operation mode, such that the flushing gas is injected into the at least one main combustion chamber 4. The flushing gas of this embodiment is provided to the direct fuel injectors 14 by the second gaseous fuel source 15, which also serves as a supply system of flushing gas 16 and is capable to provide the direct fuel injectors 14 during operation according to the first operation mode by the control of the control unit 11 with second fuel as flushing gas.

Therefore, during operation according to first operation mode, the air-fuel-mixture supplied via the at least one intake valve 7 to the main combustion chamber 4 of the internal combustion engine 1 is combusted, wherein the air-fuel-mixture in the main combustion chamber 4 is—preferably intermittently—admixed by a small second fuel mass injected via the direct fuel injectors 14.

The small second fuel mass flushing the direct fuel injectors 14 cools the direct fuel injectors 14 and removes unwanted deposits in the direct fuel injectors 14, in particular their tip portions which are directly adjacent to the main combustion chamber 4 or protrude into the main combustion chamber 4.

During operation according to the second operation mode, the control unit 11 is configured to supply a second gaseous fuel to the at least one main combustion chamber 4 of the internal combustion engine 1 by use of the direct fuel injector 14 and to supply air to the at least one main combustion chamber 4 of the internal combustion engine 1 via the at least one intake valve 7, such that an air-fuel-mixture is provided by mixing of the supplied air and the supplied second fuel in the at least one main combustion chamber 4.

The control unit 11 is configured control the direct fuel injectors 14 such that a time of injection, a time of activation of the direct fuel injector 14 and/or an amount of injected flushing gas differs from the time of injection, the time of activation of the direct fuel injector 14 and/or the amount of injected second fuel.

Figure 2:
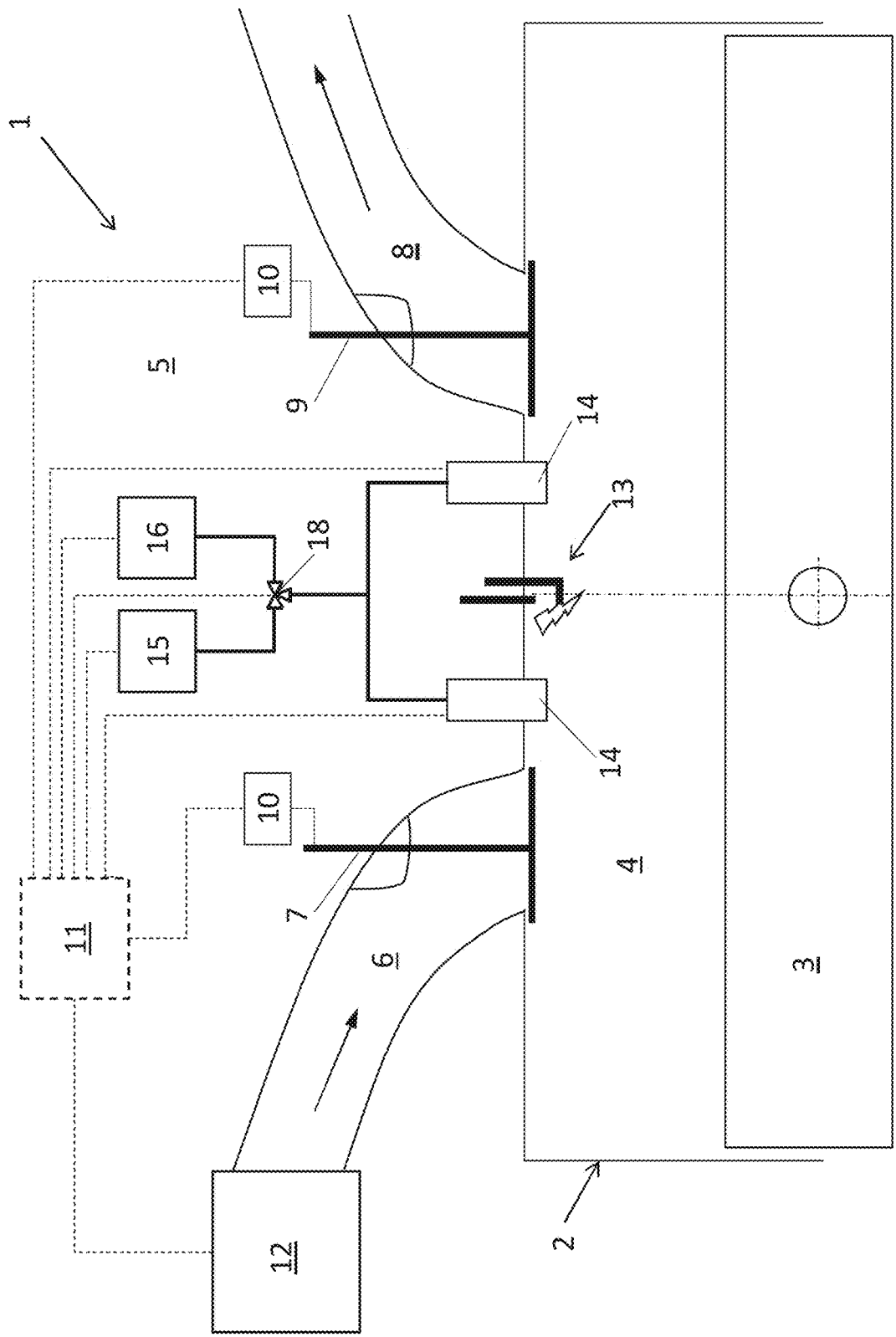

FIG. 2 discloses schematically a piston-cylinder unit of an internal combustion engine 1 according to a second embodiment of the invention.

The embodiment of FIG. 2 comprises
- a first source for the first gaseous fuel connected to the gas mixing device 12 (providing an air-fuel mixture using natural gas as fuel), and/or
- a second gaseous fuel source 15 for the second gaseous fuel (e.g., hydrogen) connected to the direct fuel injector 14, wherein there is furthermore provided a switching valve 18 such that the direct fuel injector 14 can be supplied with the second gaseous fuel by the second gaseous fuel source 15 during operation according to the second operation mode and can be supplied by the supply system of flushing gas 16 for providing flushing gas (e.g., air or an inert gas) during operation according to the first operation mode.

The switching valve 18, the second gaseous fuel source 15 and the supply system of flushing gas 16 are connected by a signal line with the control unit 11, wherein the control unit 11 is configured to control the gas mixing device 12 and the direct fuel injector 14 in order to:
  during operation according to a first operation mode, supply the first gaseous fuel to the at least one main combustion chamber 4 of the internal combustion engine 1 via the at least one intake valve 7 and—preferably intermittently—activate the direct fuel injector 14, such that the flushing gas provided by the supply system of flushing gas 16 is injected into the at least one main combustion chamber 4, and
  during operation according to a second operation mode, supply a second gaseous fuel to the at least one main combustion chamber 4 of the internal combustion engine 1 by use of the direct fuel injector 14.

A switching over of the supply with flushing and the second fuel for the direct fuel injector 14 between the first operation mode and the second operation mode, respectively, as mentioned can be achieved by use of the control unit 11 controlling the switching valve 18 accordingly.

Figure 3:
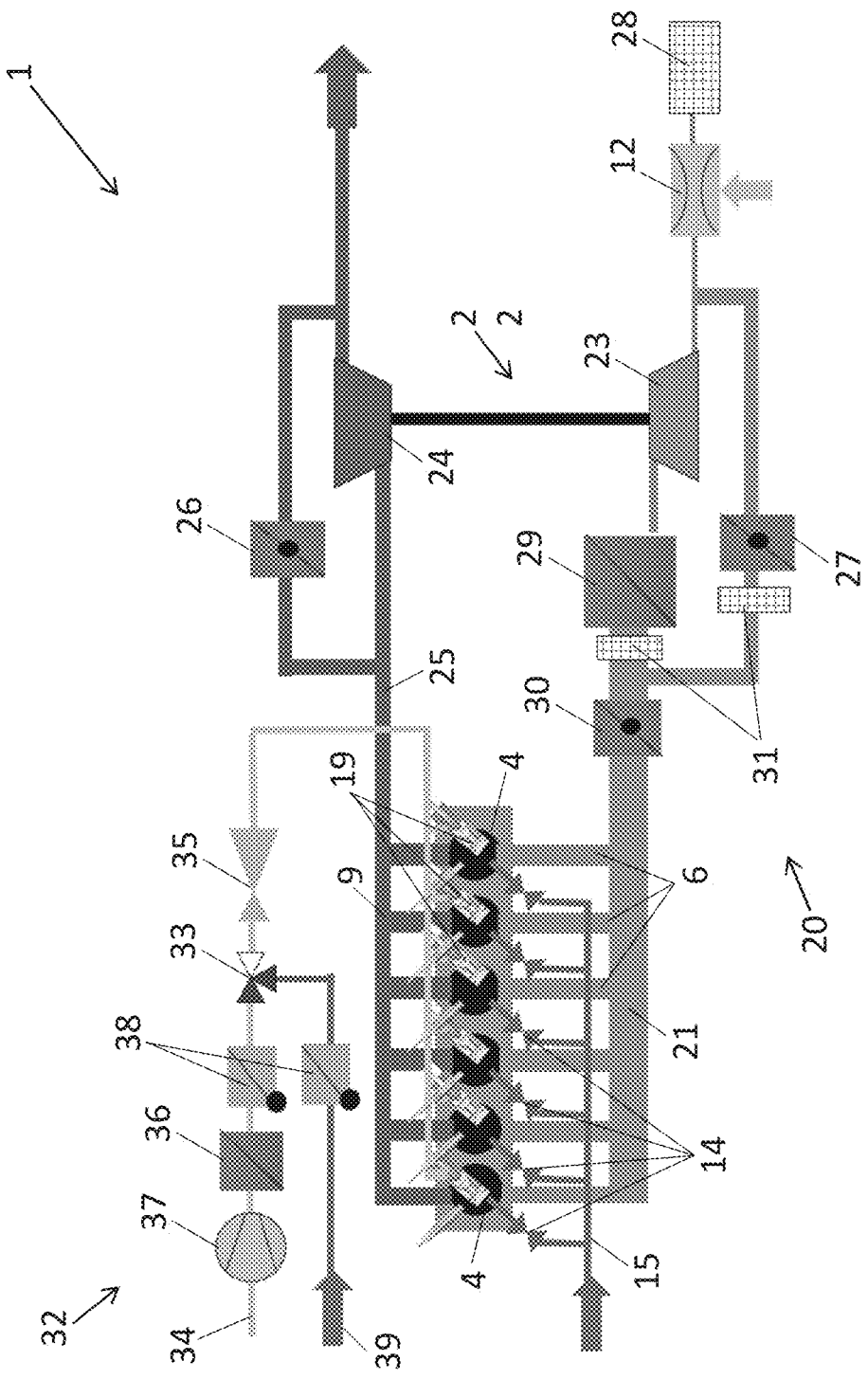
FIG. 3 illustrates a schematic representation of the parts of an internal combustion engine.

FIG. 3 shows a schematic representation of the parts of an internal combustion engine 1 according to the invention. In the embodiment shown in FIG. 3, the internal combustion engine 1 is represented by six main combustion chambers 4, wherein each main combustion chamber 4 is fluidically coupled by transfer passages (not shown) with a pre-chamber 19.

In the embodiment of FIG. 3, the main combustion chambers 4 of the internal combustion engine 1 can be directly supplied by an air or air-fuel-mixture by use of the main combustion intake system 20.

The main combustion intake system 20 shown by the embodiment of FIG. 3 comprises intake ports 6 providing the air or air-fuel-mixture which is supplied via intake valves 7 (not shown here for reasons of clarity) to the main combustion chambers 4.

The intake ports 6 are connected to an intake manifold 21, wherein by using the intake manifold 21 the air or air-fuel-mixture (e.g., a mixture of air and natural gas) can be provided for the intake port 6.

The intake manifold 21 is used to provide air or an air-fuel-mixture for more than one main combustion chamber 4 (as can be seen in FIG. 3). In most cases, the intake manifold 21 fluidically connects the intake ports 6 with an air or air-fuel-mixture source, e.g., a gas mixing device 12.

The shown main combustion intake system 20 further comprises a turbocharger 22, wherein a compressor 23 of the turbocharger 22 is driven by the turbine 24 arranged in the exhaust line 25.

The exhaust gases after combustion in the main combustion chambers 4 are passed via the exhaust manifold 8 into the exhaust line 25 to the exhaust turbine 24 of the turbocharger 22, wherein the exhaust turbine 24 is driven by the exhaust flow.

The exhaust turbine 24 is coupled by a shaft with the compressor 23, wherein the compressor 23 is driven by the turbine 24.

The turbocharger 22 can be controlled by controlling the wastegate 26 and the compressor bypass valve 27, wherein by use of the wastegate 26 an exhaust flow bypassing the turbine 24 can be varied and by use of the compressor bypass valve 27 an air-fuel-mixture flow bypassing the compressor 23 can be controlled for controlling a boost pressure generated by the turbocharger 22.

The compressor 23 is arranged in the main combustion intake system 20 in a flow direction downstream of the gas mixing device 12 and charges the air-fuel-mixture provided by the gas mixing device 12 according to a desired boost pressure.

The gas mixing device 12 mixes an air provided by an air filter 28 with a fuel, e.g., a natural gas. The gas mixing device 12 shown by this embodiment is a gas mixing device 12 working according to the venturi principle.

In a flow direction downstream of the compressor 23 and the compressor bypass line, an intercooler 29 is provided for cooling down the charged air or air-fuel-mixture to increase the combustion efficiency.

Between the intercooler 29 and the main combustion chambers 4 (or the branches of the intake ports 6), a throttle valve 30 is provided for controlling the air or air-fuel-flow passed to the main combustion chambers 4.

Furthermore, flame arrestors 31 can be arranged between the throttle valve 30 and the intercooler 29 or the compressor bypass valve 27.

The pre-chambers 19 can be supplied by the pre-chamber intake system 32, wherein an air-fuel mixture or a second fuel (hydrogen) can be provided by the pre-chamber intake system 32 for the pre-chambers 19.

The pre-chamber intake system 32 comprises active pre-chamber 19 gas valves which are arranged at each pre-chamber 19 for controlling the supply to the pre-chambers 19 during an intake stroke and/or partially during compression stroke.

It can be provided that a single active pre-chamber 19 gas valve for at least one or each pre-chamber 19 is arranged in a spark plug sleeve, in a pre-chamber 19 or in a cylinder head 5 directly (not shown in detail).

Via the pre-chamber 19 gas valves, a fuel or air-fuel mixture can be supplied by use of the pre-chamber supply line 32.

The pre-chamber intake system 32 comprises a control valve 33, wherein the pre-chamber intake system 32 can be switched between two different fuel sources.

The pre-chamber intake system 32 can be supplied by a first fuel source via the first fuel supply line 34 (e.g., first supply line). It can be provided that the first fuel supply line 34 provides hydrogen to the pre-chambers 19.

Optionally, a pressurizing device 35 and/or a compressor 37 and/or temperature regulating device 36 can be arranged in the first fuel supply line 34. Preferably, it can be provided, that a unidirectional valve 38 is arranged in the first fuel supply line 34.

Furthermore, a second supply line 39 is provided in the pre-chamber intake system 32, wherein by controlling the control valve 33 the fuel source for the pre-chambers 19 can be changed by choosing the first supply line 34 or the second supply line 39.

The second supply line 39 can provide pre-chambers 19 by a different fuel as the first supply line 34 or by the same fuel but with a different pressure level.

Pre-chambers 19 usually serve as ignition intensifiers, in which the fuel-air mixture (that is highly compressed at the end of the compression stroke) is ignited in a relatively small secondary space separate from the main combustion chamber 4 of the cylinders 2. In this case, a main combustion chamber 4 is delimited by the working piston 3, the cylinder liner, and (a flame plate of) the cylinder head 5, wherein the secondary space (the pre-chamber 19) is connected via one or a plurality of transfer passages with the main combustion chamber 4.

As described above, these pre-chambers 19 are scavenged or filled with fuel gas, air-fuel mixture or air-fuel mixture together with an exhaust gas recirculation (EGR) content during the gas exchange phase in order to improve the ignition and combustion properties in the pre-chamber 19.

The small second fuel mass flushing the direct fuel injectors 14 cools the direct fuel injectors 14 and removes unwanted deposits in the direct fuel injectors 14, in particular their tip portions which are directly adjacent to the main combustion chamber 4 or protrude into the main combustion chamber 4.

At full load, large gas engines are usually run lean, at lambda λ of approx. 1.6 to 2.2, i.e., the amount of air in the mixture corresponds to about twice the stoichiometric amount of air.

A direct fuel injector 14 is provided to supply a second fuel (e.g., hydrogen) provided by a second gaseous fuel source 15 directly into the main combustion chamber 4.

In the second operation mode of the internal combustion engine 1, the gas mixing device 12 and/or port injection valve(s) is (are) turned off by a control signal of the control unit 11, wherein only air is passed to the compressor 23.

The charged air is supplied via the intake manifold 21, the intake ports 6, and the intake valves 7 directly to the main combustion chambers 4, wherein fuel (more precisely hydrogen) is passed to the main combustion chambers 4 via the direct fuel injector 14 by use of the second gaseous fuel source 15 during intake stroke and/or the compression stroke.

During the compression stroke, the hydrogen and the charged air are mixed in the main combustion chamber 4 at the second operation mode.

During operation according to first operation mode, the air-fuel-mixture supplied via the at least one intake valve 7 to the main combustion chamber 4 of the internal combustion engine 1 is combusted, wherein the air-fuel-mixture in the main combustion chamber 4 is—preferably intermittently—admixed by a small second fuel mass injected via the direct fuel injectors 14.

FIG. 4 discloses a schematic diagram of a cylinder pressure during the combustion phases of an internal combustion engine 1, wherein the pressure variation can be seen during the intake, compression, combustion, and exhaust phases.

Furthermore, the top dead center (TDC) positions and the bottom dead center (BDC) positions of the piston 3 during the combustion cycle are indicated.

The time windows 17 shown in this diagram indicate possible injection times for the flushing gas via the direct fuel injector 14 during the combustion cycle, wherein it can be seen that an injection of flushing gas preferably takes place during exhaust and/or an intake and/or a compression stroke of the at least one main combustion chamber 4 during operation according to the first operation mode.

Preferably, it is provided that the control unit 11 is configured to activate the direct fuel injector 14 to supply flushing gas during a period of time in the combustion cycle during operation according to the first operation mode, when a pressure level in the at least one main combustion chamber 4 is below a pressure level upstream of the direct fuel injector 14 in the supply system of flushing gas.

LIST OF USED REFERENCE SIGNS 1 internal combustion engine
2 cylinder
3 piston
4 main combustion chamber
5 cylinder head
6 intake port
7 intake valve
8 exhaust manifold
9 exhaust valve
10 actuators
11 control unit
12 gas mixing device
13 spark plug
14 direct fuel injector
15 second gaseous fuel source
16 supply system of flushing gas
17 time window
18 switching valve
19 pre-chamber
20 main combustion intake system
21 intake manifold 22 turbocharger
23 compressor
24 turbine
25 exhaust line
26 wastegate
27 compressor bypass valve
28 air filter
29 intercooler
30 throttle valve
31 flame arrestor
32 pre-chamber intake system
33 control valve
34 first supply line
35 pressurizing device
36 temperature regulating device
37 compressor
38 unidirectional valve
39 second supply line

The invention claimed is:

1. An internal combustion engine, comprising:
   at least one main combustion chamber,
   a gas mixing device or a port injection valve, which is configured to supply a first gaseous fuel to the main combustion chamber via at least one intake valve,
   a direct fuel injector, which is configured to directly inject a second gaseous fuel into the main combustion chamber, and
   a controller configured to control the gas mixing device and/or the port injection valve and the direct fuel injector in order to:
      in a first operation mode, supply the first gaseous fuel to the at least one main combustion chamber of the internal combustion engine via the at least one intake valve,
      in a second operation mode, supply the second gaseous fuel to the at least one main combustion chamber of the internal combustion engine by use of the direct fuel injector,
   wherein a supply system for providing flushing gas to the direct fuel injector is provided and the controller is configured to activate the direct fuel injector during operation according to the first operation mode, such that the flushing gas is injected into the at least one main combustion chamber, wherein the flushing gas comprises at least one of: air and/or inert gas in a mass that is maximally 50% of an overall fuel mass supplied to the at least one main combustion chamber during a combustion cycle during operation according to the first operation mode; or a fuel that provides maximally 30% of the overall energy released during the combustion cycle during the first operation mode.

2. The internal combustion engine according to claim 1, wherein the controller is configured to activate the direct fuel injector during an exhaust stroke and/or an intake stroke and/or a compression stroke of the at least one main combustion chamber in the first operation mode.

3. The internal combustion engine according to claim 1, wherein the controller is configured to control the direct fuel injector to supply the second gaseous fuel and/or a different gaseous fuel as the flushing gas via the direct fuel injector to the at least one main combustion chamber during operation according to the first operation mode, during an exhaust stroke of the internal combustion engine.

4. The internal combustion engine according to claim 1, wherein the controller is configured to activate the direct fuel injector to supply the flushing gas during a period of time in the combustion cycle during operation according to the first operation mode, when a pressure level in the at least one main combustion chamber is below a pressure level upstream of the direct fuel injector in the supply system for the flushing gas.

5. The internal combustion engine according to claim 1, wherein the controller is configured to control the direct fuel injector to supply maximally 30% of the overall energy amount released during the combustion cycle during operation according to the first operation mode by the flushing gas in the form of the fuel via the direct fuel injector.

6. The internal combustion engine according to claim 1, wherein the controller is configured to control the direct fuel injector to supply the air and/or inert gas in the mass that is maximally 50% of the overall fuel mass supplied to the at least one main combustion chamber during the combustion cycle during operation according to the first operation mode via the direct fuel injector.

7. The internal combustion engine according to claim 1, wherein the controller is configured to activate the direct fuel injector during the first operation mode for one or more combustion cycles after passing a predefined number of combustion cycles without activating the direct fuel injector.

8. The internal combustion engine according to claim 1, wherein the controller is configured to control the gas mixing device and/or port injection valve to:
   supply during operation according to the first operation mode an air-fuel-mixture comprising air and the first gaseous fuel into the at least main combustion chamber via the at least one intake valve, and/or
   supply during operation according to the second operation mode air to the at least one main combustion chamber of the internal combustion engine via the at least one intake valve, such that an air-fuel-mixture is provided by mixing of the supplied air and the supplied second gaseous fuel provided via the direct fuel injector in the at least one main combustion chamber.

9. The internal combustion engine according to claim 1, wherein at least one spark plug is provided in the at least one main combustion chamber to ignite the combustible air/fuel mixture during operation according to the first operation mode and/or the second operation mode.

10. The internal combustion engine according to claim 1, comprising:
    a first source for the first gaseous fuel connected to the gas mixing device and/or the port injection valve, and/or
    a second gaseous fuel source for the second gaseous fuel connected to the direct fuel injector, further comprising a switching valve such that the direct fuel injector can be supplied with the second gaseous fuel by the second gaseous fuel source in the second operation mode and can be supplied by the supply system of the flushing gas for providing the flushing gas during the first operation mode.

11. The internal combustion engine according to claim 1, wherein the supply system of the flushing gas is configured to supply the second gaseous fuel to the direct fuel injector during operation according to the second operation mode, wherein the flushing gas and the second gaseous fuel are identical.

12. The internal combustion engine according to claim 1, wherein the controller is configured to control the direct fuel injector such that a time of injection, a time of activation of the direct fuel injector and/or an amount of injected flushing gas during operation according to the first operation mode differs from the time of injection, the time of activation of the direct fuel injector and/or the amount of injected second fuel during operation according to the second operation mode.

13. A method for operating the internal combustion engine according to claim 1, wherein the method comprises:
supplying in the first operation mode the first gaseous fuel via the at least one intake valve to the at least one main combustion chamber of the internal combustion engine,
supplying in the second operation mode the second gaseous fuel directly to the at least one main combustion chamber using the direct fuel injector,
wherein the method further comprises activating the direct fuel injector during operation according to the first operation mode such that the flushing gas is injected into the at least one main combustion chamber.

14. The internal combustion engine according to claim 1, wherein the first gaseous fuel comprises natural gas.

15. The internal combustion engine according to claim 1, wherein the second gaseous fuel comprises hydrogen.

16. A system, comprising:
a controller configured to control a gas mixing device and/or a port injection valve and a direct fuel injector of an internal combustion engine to:
in a first operation mode, supply a first gaseous fuel to at least one main combustion chamber of the internal combustion engine via at least one intake valve,
in a second operation mode, supply a second gaseous fuel to the at least one main combustion chamber of the internal combustion engine by use of the direct fuel injector,
activate the direct fuel injector during operation according to the first operation mode, such that a flushing gas is injected into the at least one main combustion chamber, wherein the flushing gas comprises at least one of: air and/or inert gas in a mass that is maximally 50% of an overall fuel mass supplied to the at least one main combustion chamber during a combustion cycle during operation according to the first operation mode;
or a fuel that provides maximally 30% of the overall energy released during the combustion cycle during the first operation mode.

17. The system of claim 16, wherein the first gaseous fuel comprises natural gas, and the second gaseous fuel comprises hydrogen.

18. The system of claim 16, wherein the flushing gas comprises the air and/or inert gas in the mass that is maximally 50% of the overall fuel mass supplied to the at least one main combustion chamber during the combustion cycle during operation according to the first operation mode.

19. The system of claim 16, wherein the flushing gas comprises the fuel that provides maximally 30% of the overall energy released during the combustion cycle during the first operation mode.

20. A method, comprising:
controlling, via a controller, a gas mixing device and/or a port injection valve and a direct fuel injector of an internal combustion engine to:
in a first operation mode, supply a first gaseous fuel to at least one main combustion chamber of the internal combustion engine via at least one intake valve,
in a second operation mode, supply a second gaseous fuel to the at least one main combustion chamber of the internal combustion engine by use of the direct fuel injector, and
activate the direct fuel injector during operation according to the first operation mode, such that a flushing gas is injected into the at least one main combustion chamber, wherein the flushing gas comprises at least one of: air and/or inert gas in a mass that is maximally 50% of an overall fuel mass supplied to the at least one main combustion chamber during a combustion cycle during operation according to the first operation mode; or a fuel that provides maximally 30% of the overall energy released during the combustion cycle during the first operation mode.

21. The method of claim 20, wherein the first gaseous fuel comprises natural gas, and the second gaseous fuel comprises hydrogen.

22. The method of claim 20, wherein the flushing gas comprises the air and/or inert gas in the mass that is maximally 50% of the overall fuel mass supplied to the at least one main combustion chamber during the combustion cycle during operation according to the first operation mode.

23. The method of claim 20, wherein the flushing gas comprises the fuel that provides maximally 30% of the overall energy released during the combustion cycle during the first operation mode.

* * * * *